3,554,716
Patented Jan. 12, 1971

3,554,716
METHOD OF TREATING DIAMOND POWDER
Warren W. West, Gibbstown, N.J., assignor to E. I. du Pont de Nemours and Company, Wilmington, Del., a corporation of Delaware
No Drawing. Filed Aug. 8, 1968, Ser. No. 751,062
Int. Cl. B24d 3/02; C11d 3/02
U.S. Cl. 51—293          10 Claims

ABSTRACT OF THE DISCLOSURE

Diamond powder is treated to make its individual particles blocky and eliminate particles having internal weaknesses by entraining the powder in an inert gas stream moving at a velocity of about from 200 to 900 ft./sec., and impinging such stream with at least one jet of inert gas which causes the entrained particles to impact each other at a velocity sufficient to remove their friable portions.

BACKGROUND OF THE INVENTION

Diamond powder is used widely as an abrasive in lapping and polishing operations, including, for example, the lapping of tools and dies such as cutting tools, taps, deep-drawing dies, forming dies, coining dies, etc. of steel or carbide; and the polishing of plastic molds, metallurgical specimens, ceramics, semiconductors, semi-precious stones, and watchmaking tools and jewels. The size grades ordinarily employed range from the finest powder (0–1 or 0–2 micron range) to grades whose application demands fast stock removal (up to grade 100 mesh, U.S. National Bureau of Standards).

It is well-recognized that the efficiency of a lapping or polishing operation with diamond abrasives is dependent on how uniformly graded the diamond powder is. A poorly graded powder, i.e., one that contains large and small sizes, is wasteful and unreliable and produces an uneven cutting action and a scratched, pitted surface. The separation of diamond powder into micron-size fractions is done by "drop column" or similar techniques in which the powder is suspended in a fluid, e.g., water, and the particles are graded by sedimentation according to their velocity of fall in a column of the fluid. These techniques are dependent on Stokes law, which is valid only for spherical particles. Therefore, the more closely the particles approximate spheres, i.e., the blockier their shape, the more likely they are to settle at a uniform rate according to Stokes law and the closer the grading possible. However, in diamond powders from natural as well as synthetic sources, the particles usually have sharp points or edges on a macro scale, and flakes, splinters, and slivers usually are present. It is seen, therefore, that a method is needed whereby such powders can be treated to convert the particles therein to a blocky shape, thus permitting a more uniform grading of the powders and consequently affording greater efficiency when the powders are used in lapping and polishing operations. Also, such method must not excessively reduce the minimum dimension of the individual diamond particles and thereby downgrade the powder to the point where its range of utilities is substantially diminished.

SUMMARY OF THE INVENTION

This invention provides a process for shaping particles of diamond powder without causing excessive size reduction and comprises entraining the diamond powder in a stream of inert gas moving at a velocity of about from 200 to 900 ft./sec.; impinging such stream with at least one jet of said inert gas, which jet is directed in the same general direction as the inert gas stream but at an acute angle thereto, whereby the particles of diamond powder are driven into each other at a velocity sufficient to remove friable portions thereof; and recovering the resulting blocky diamond particles.

"Diamond powder," as used herein, denotes a mass of diamond particles ranging in size from grade ½ (0–1 micron) up to about grade 100 mesh (U.S. National Bureau of Standards; equivalent to 100–120 mesh size), the range of sizes being wide or narrow. However, since an important benefit of the present process is the uniform gradeability of the diamond powder treated thereby, usually the powder employed in the process is in a pre-final-grading condition, i.e., it will usually contain a wider range of sizes than is normally employed in lapping compositions. The particles of powder usually are in the subsieve sizes, i.e., grade 45 (30–60 micron or 325 mesh) or smaller.

DETAILED DESCRIPTION OF THE INVENTION

The diamond powder treated according to the present process consists of a mass of particles, a large number of which are irregularly shaped. Also, a number of particles may have internal weaknesses which would cause them to deteriorate during use, e.g., in lapping operations, thus reducing their effectiveness. Irregularity of shape refers to a departure from an equi-dimensioned configuration such as a cube or sphere, and denotes a more or less elongated particle or sliver or a flattened or plate-like particle. When treated according to the present process, sharp surface projections are removed from the particles, and slivers and flakes as well as particles which contain internal weaknesses are broken up so as to produce a substantially blocky powder. When the powder produced is described as "blocky," it is meant that a large proportion of the particles therein may be described as more closely resembling cubes or spheres than elongated or flattened shapes.

The particles of diamond are shaped by the combined action of their high-velocity flow in the inert gas stream and the impingement of at least one jet moving at at least as high a velocity as the gas stream, but not in excess of about 900 ft./sec. The jet deflects the stream and creates turbulence which causes the high-velocity diamond particles to impact each other at a velocity sufficient to remove their friable portions and thereby effect the desired shaping of the individual particles. The velocity of the fluid stream should be about from 200 to 900 ft./sec. Substantially lower velocity provides insufficient shaping and substantially higher velocity results in excessive size reduction. Best results have been achieved when the velocity of the inert gas stream is about from 500 to 600 ft./sec.

The gas may be air, nitrogen, steam, or any other gas medium which does not have a deleterious effect upon the diamond powder. A substantially anhydrous gas is preferred, particularly when diamond powders of sub-sieve sizes are being treated because such powders have a tendency to cake in the presence of moisture.

The shape of the path the gas stream follows is not critical and may be straight, curved, etc., but preferably will be of generally circular configuration because the combination of centrifugal force thus generated and the entraining force of the fluid provides the means for automatically removing particles which have been shaped as desired, while recycling insufficiently shaped particles for further impingement by the jet. Otherwise, e.g., where the stream follows a straight path and the powder is collected, e.g., by directing the stream into a cyclone separator, manual recycling of the powder is required if microscopic examination of the resulting product reveals that further shaping is necessary. Among the suitable generally-circular path configurations are circular, spiral and oval.

As previously indicated, at least one jet impinges the high velocity stream of inert gas and diamond powder thereby deflecting the stream and creating turbulence which cause the particles of diamond powder to violently impact one another at a velocity sufficient to remove their friable portions. The jet(s) are directed in the same general direction as the gas stream but at an acute angle thereto, thus propelling the diamond powder forward while creating the requisite turbulence. Where the inert gas stream follows a generally circular path, the jet(s) point in the direction of the gas's rotation along a line tangential to a circle of smaller diameter than the path of the gas stream. In such cases, the diamond powder will normally be injected into the gas stream at or near its periphery by the same inert gas that forms the jets, and these two sources of inert gas will then comprise the main gas stream. The maximum number of jets employed is not critical, but does determine the amount of treatment time required to provide a given degree of shaping. A plurality of jets, e.g. 3 to 10, will normally be employed to reduce treatment time.

Although the present process is not a milling process, it may be suitably carried out in milling machines of the fluid-energy type which are commonly employed to grind solids utilizing a compressible fluid, e.g., air or steam, as a source of energy. Available mills of this type are known as the Micronizer, the Reductionizer and Jet-O-Mizer, the latter two being substantially the same but made by different companies. A description of the construction and operation of these mills is readily available, for example in at least one of the following publications: Chemical Engineering, Dec. 10, 1962, pages 145–6; Industrial and Engineering Chemistry, vol. 38, No. 7, 1946, pages 675–678; and Sturtevant Mill Company brochure entitled "Sturtevant Micronizer Fluid Energy Mills." The teachings of these publications are incorporated herein by reference. In the Micronizer the inert gas stream follows a spiral path in a generally cylindrical chamber, and in the Reductionizer and Jet-O-Mizer, it follows an oval path in a tubular oval chamber. Hereinafter, the motion of the gas stream as it follows such paths will be referred to as rotation, the axis of rotation being perpendicular to the plane of the path.

Irrespective of the particular apparatus employed to carry out the process of this invention, the inside of the chamber, i.e., the inner surfaces which define the path of the fluid stream and entrained diamond powder, preferably are lined with a conforming replaceable abrasion-resistant material such as steel, "Stellite," ceramic, elastomer, etc. The inner diameter of the chamber, i.e., the inner diameter of the liner if there is one, will depend on the amount of diamond powder which it is desired to handle per unit of time.

Diamond powder can be admitted into the chamber and fed into the rapidly rotating fluid stream therein through an opening in or near the peripheral wall. Any suitable feed means may be employed, e.g., an aspirating Venturi feeder, which utilizes the compressed gas for injecting the feed into the chamber. Diamond particles become entrained in the gas stream so that a rapidly rotating suspension is produced. Particle impacts particle, and to a lesser extent the chamber wall, as the jet(s) intersect the path of the rotating suspension. Heavier particles are kept in suspension in the peripheral zone of the path by centrifugal force while lighter (shaped) particles are drawn to the outlet at the inside of the path by the entraining force of the gas stream.

As stated previously, the present process transforms diamond particles by removing sharp edges and breaking up slivers and other weak particles so as to produce a substantially blocky powder. While surface portions are removed from the particles, and particles are broken up internally if any weaknesses are present therein, the conditions employed are such that an extensive milling or grinding action does not occur. Thus, the present process does not effect the complete internal breakup of particles to produce fines that is characteristic of milling processes.

Variables which affect the action produced on the particles are the rotational speed of the suspension, the fluid flow rate, and the internal size of the treatment chamber. Control of the first two factors is usually accomplished by controlling the rate of solid feed and the fluid pressure at the orifices. Faster feed rates and/or lower fluid pressures produce lower rotational speeds and fluid flow rates. The residence time of the particles in the chamber depends on the size of the particles and the rotational speed of the suspension. For a given chamber size and rotational speed, heavier particles remain in rotation longer than lighter particles. For a given chamber size, faster exit of a given particle is produced by lowering the rotational speed. In the present process, the rotational speed of the diamond/fluid suspension must be high enough to effect the desired changes in the particles and also low enough to permit all particles to be drawn to the outlet before extensive milling can occur. When the process is undertaken for the first time with a given powder in a given chamber, i.e., under a given set of conditions of chamber diameter and height, number of fluid jets, angle of the jets, and location of the solid feed inlet, preliminary testing is desirable to ascertain how high a feed rate is required at given fluid pressure to avoid extensive milling. Usually a higher feed rate and/or lower fluid pressure are employed with powders having higher proportions of larger particles. If it should appear that larger particles cannot be removed from the chamber rapidly enough by lowering of the rotational speed without at the same time interfering with the shaping action desired, faster removal may be effected by auxiliary means, e.g., by pulsating the injection of the inert gas.

When a Laboratory Series Micronizer is employed in which the chamber has an inner diameter of four inches and an axial height of 9/16 inch, and five air jets and a powder feed inlet equally spaced around its peripheral wall on axes which are tangential to a circle having a 1.5-inch radius, a suitable diamond powder feed rate is about from 0.5 to 8 pounds per hour when the pressure of the inert gas, e.g., air, fed to the jets is about from 75 to 125 pounds per square inch. Within these ranges, lower feed rates and higher air pressures are employed with powders in which most of the diamond particles are in finer size ranges, while higher feed rates and lower air pressures are employed with powders containing a high proportion of larger particles. When most of the particles to be treated are less than about grade 30 (20–40 microns), feed rates of about from 0.5 to 2 pounds per hour are preferred, while feed rates of about from 3.5 to 6 pounds per hour are preferred with powders containing a high proportion of grade 30 and larger. Best results are obtained when sub-grade 30 particles are separated and treated independently of larger particles.

Any suitable means may be used to collect the powder drawn to the outlet in the chamber. For example, a cyclone-type collector may be fitted into the outlet and the product discharged from these into a bin or bag, exhaust gas from the cyclone leaving the chamber through an outlet opposite the collection outlet. If desired, a second cyclone or cloth bag filter may be employed on the exhaust gas. Also, a collection tube of somewhat smaller diameter than the collection outlet may be passed axially through both sides of the chamber, e.g., of the Micronizer, so that the suspension may leave the chamber through the outlet in the annular space around the collection tube, flowing into a cyclone collector and attached bag, and exhaust gas may pass up through the tube and into a second collector bag.

The following examples serve to illustrate specific embodiments of the process of this invention. However, they will be understood to be illustrative only and not as limiting the invention in any manner. In each of the following examples, the velocity of the air stream is about from 500 to 600 ft./sec.

EXAMPLE 1

Diamond powder is treated in a Laboratory Series Micronizer fluid energy mill manufactured by the Sturtevent Mill Company, Boston, Mass. The treatment chamber has a 4-inch diameter and 9/16-inch axial height. The gas used is compressed air emerging in the form of jets from nozzles at five orifices (0.0785 inch diameter) which, together with a powder feed inlet (0.089 inch diameter), are located in the peripheral wall of the chamber at equally spaced distances from each other on axes which are tangential to a circle having a 1.5-inch radius. The powder feed inlet is comprised of an aspirating Venturi feeder which utilizes compressed air to inject the feed into the chamber. All parts are made of mild steel, except for the air feed nozzles, Venturi, and powder feed nozzles which are made of stainless steel. A cyclone collector fits into a circular opening coaxial with the chamber for collecting the treated powder. The cyclone discharges the powder into a cloth collector bag. The exhaust gas from the cyclone leaves through an axial outlet in the opposite side of the chamber and discharges through a cloth dust collector.

Diamond powder is fed through the mill at a rate of about 4.4 pounds per hour. Air pressure is 85 p.s.i. The diamond powder fed into the mill is a blend of particles of sizes ranging from 15 to 36 microns and was produced by shock-synthesis as described in copending, coassigned U.S. patent application Ser. No. 602,445, filed Nov. 2, 1966 and now U.S. Pat. No. 3,401,019. The particles are irregular in shape and slivers are present.

98.3% of the diamond powder is recovered from the mill. Microscopic examination of the particles reveals that they are free of sharp corners and are blocky in appearance. Substantially no slivers are present. 58%, by weight, of the particles in the recovered powder are smaller than 15 microns.

Substantially the same results are obtained when similar samples of powder are treated in a 2-inch Laboratory Series Micronizer mill using a diamond feed rate of 0.8 pound/hr. and an air pressure of 85 p.s.i., and in a 1-inch Jet-O-Mizer using a feed rate of 0.4 pound/hr. and an air pressure of 100 p.s.i.

EXAMPLE 2

The procedure described in Example 1 is repeated with the exception that the diamond powder treated is natural diamond of −325 mesh size (passes through a 325-mesh, and is held on a 400-mesh, screen); 36 to 54 microns. The diamond feed rate is 5 pounds per hour, and the air pressure is 85 p.s.i. The particles obtained are blocky, and slivers are absent. The particle size distribution of the treated powder is, by weight:

| Microns: | Percent |
| --- | --- |
| +36 | 18 |
| 22–36 | 44 |
| 12–22 | 22 |
| 8–12 | 8 |
| 4–8 | 5 |
| 0–4 | 3 |

Substantially the same results are obtained when G. E. "Man-Made" diamond powder of similar size is treated under the above conditions.

What is claimed is:
1. A method of treating diamond powder to make its individual particles blocky in shape comprising:
  (a) entraining the diamond powder in a steam of inert gas moving at a velocity of about from 200 to 900 ft./sec.;
  (b) impinging said stream with at least one jet of said inert gas, which jet is directed in the same general direction as said stream, but at an acute angle thereto, whereby the particles of diamond powder are driven into each other at a velocity sufficient to remove friable portions thereof; and
  (c) recovering the diamond powder thus obtained.

2. A method of claim 1 wherein the inert gas stream is substantially anhydrous and is moving at a velocity of about from 500 to 600 ft./sec.

3. A process of claim 1 wherein the stream is caused to follow a generally circular path.

4. A process of claim 3 wherein said stream follows a spiral path.

5. A process of claim 4 wherein the rotational speed of the gas stream and diamond powder is sufficient to keep the heavier particles of diamond powder in the peripheral zone of said path while the lighter particles are carried to the inside of said path by the entraining force of the gas stream, and the inside portion of said stream is drawn off and the blocky diamond particles contained therein are collected while leaving the heavier particles in the inert gas stream for further treatment.

6. A process of claim 5 wherein the inert gas stream enters the periphery of the spiral and leaves at about its center.

7. A process of claim 6 wherein the inert gas stream is substantially anhydrous and is moving at a velocity of about from 500 to 600 ft./sec.

8. A process of claim 7 wherein the inert gas stream follows said spiral path in a substantially cylindrical chamber and then leaves in a substantially axial direction from the center of the chamber, a plurality of said jets enter said chamber at points spaced around its periphery, and the diamond powder is injected into the periphery of the chamber by an inert gas, which gas and the jets together form said inert gas stream.

9. A process of claim 8 wherein the particles of diamond powder are less than about 60 microns in size.

10. A process of claim 9 wherein the disk-shaped chamber is about 4 inches in diameter and about 9/16-inch high, the inert gas fed to the jets and powder inlet is at a pressure of about from 75 to 125 p.s.i., and the diamond powder is fed to the chamber at a rate of about from 0.5 to 8 pounds per hour.

References Cited

UNITED STATES PATENTS

| | | | |
| --- | --- | --- | --- |
| 1,300,192 | 4/1919 | Overstrom | 241—5 |
| 3,254,848 | 6/1966 | Stephanoff | 241—39 |
| 3,401,019 | 9/1968 | Cowan et al. | 23—209.1 |
| 3,371,448 | 3/1968 | Christensen | 51—163 |
| 2,032,827 | 3/1936 | Andrews | 241—5 |

OTHER REFERENCES

Berry "Modern Machines for Dry Size Reduction in Fine Size Range," Industrial and Eng. Chemistry, vol. 38, No. 7, 1946, pp. 672–678.

Stern, "A Guide to Crushing & Grinding Practice," Chem. Eng., Dec. 10, 1962, title page and pp. 145 and 146.

Florian, "Lapping is a 'Clean Room' Operation," Cutting Tool Engineering, June 1967, pp. 21 and 22.

Sturtevant Mill Co. Brochure, "Sturtevant Micronizer Fluid Energy Mills Grind to Low and Submicron Size, 8 pages.

DONALD J. ARNOLD, Primary Examiner

U.S. Cl. X.R.

51—307; 23—209.1; 264—93